United States Patent [19]
Malek et al.

[11] Patent Number: 5,361,302
[45] Date of Patent: Nov. 1, 1994

[54] METHOD FOR ENCRYPTION SYNC COMPRESSION IN AN ENCRYPTED RADIO TELEPHONE INTERCONNECT SYSTEM

[75] Inventors: Charles J. Malek, Crystal Lake; Robert W. Furtaw, Schaumburg, both of Ill.

[73] Assignee: Motorola, Inc., Schaumburg, Ill.

[21] Appl. No.: 65,693

[22] Filed: May 7, 1993

Related U.S. Application Data

[63] Continuation of Ser. No. 662,144, Feb. 28, 1991, abandoned.

[51] Int. Cl.5 .......................... H04L 9/02; H04J 3/06; H04M 11/00
[52] U.S. Cl. ..................... 380/48; 370/109; 379/58; 379/62; 379/93; 380/28; 380/33; 380/49
[58] Field of Search .................... 370/109; 380/28, 48, 380/49, 33; 379/58, 62, 93

[56] References Cited

U.S. PATENT DOCUMENTS

| 4,815,128 | 3/1989 | Malek | 380/9 |
| 4,817,146 | 3/1989 | Szczutkowski et al. | 380/48 |
| 4,893,308 | 1/1990 | Wilson et al. | 370/109 |
| 4,893,339 | 1/1990 | Bright et al. | 380/28 |
| 5,093,829 | 3/1992 | Maher | 370/85.8 |

Primary Examiner—Stephen C. Buczinski
Attorney, Agent, or Firm—John W. Hayes

[57] ABSTRACT

A method for transparently coupling an encrypted two-way RF communication unit (100) with an encrypted landline communication unit (104). An RF message comprised of a plurality of data frames (401, 402, 403) is transmitted from the RF communication unit (100), wherein a plurality of the data frames include encrypted voice information (403). Some bits from the data frames (501, 502) are selectively removed, without removing the encrypted voice information (503), to form reduced bit data frames, and the reduced bit data frames are transmitted via the landline to the landline communication unit (104).

4 Claims, 5 Drawing Sheets

METHOD FOR ENCRYPTION SYNC COMPRESSION IN AN ENCRYPTED RADIO TELEPHONE INTERCONNECT SYSTEM

This is a continuation of application Ser. No. 07/662,144, filed Feb. 28, 1991 and now abandoned.

TECHNICAL FIELD

This invention relates generally to communication systems such as, but not limited to, encrypted radiotelephone communication systems, and is more particularly directed toward a method for allowing an encrypted telephone system communicating with an encrypted radio system to advantageously employ telephone lines with a relatively poor channel signal-to-noise ratio.

Background of the Invention

The basic operation and structure of both encrypted land mobile radio systems and encrypted telephone systems are known. Further, methods of interconnecting between encrypted land mobile radio systems via the Public Switched Telephone Network (PSTN) to encrypted telephone systems are known. Finally, counter-addressed encryption methods are well-known in the art.

Land mobile radio systems typically comprise two or more radio communication units that transceive information via RF (radio frequency) communication channels. The system may be organized as either a simple dispatch system, with a plurality of users sharing a common channel (a transmit and a receive frequency). Alternatively, it may be organized as a trunked system, with various user groups efficiently sharing a pool of available channels. Cryptology has been long applied to both dispatch and trunked radio systems in order to protect sensitive information.

Encrypted telephone systems have long been available in which protection from the threat of wire-tapping is provided. In addition to the required plain text functions, digitally encrypted telephone units conventionally consist of a modem, cryptology, a vocoder, and a controller.

Both encrypted and plain text only radio and telephone systems may be interconnected via well-known methods, allowing communication between users with radios and telephones. Further, two radio systems themselves may be interconnected via the PSTN, allowing communication between user groups in geographically separated areas.

Various methods for synchronization of key stream generators have also long been available. Cipher feedback, for example is self-synchronizing, requiring only two register lengths in order to achieve synchronization. This technique, though, suffers from an error multiplication effect, wherein a single error introduced by a communication channel causes a plurality of errors at the plain text output of the receiving unit. Counter-addressed synchronization remedies the error multiplication effect, but at the cost of needing to transmit an encryption synchronization packet (E-sync) over the channel together with the desired encrypted speech or data.

In addition, RF communication media are generally subject to Rayleigh fading. Because of the tendency for such fading components to produce a bit slip, it is usually required to transmit the encryption sync at periodic intervals throughout the message. Telephone communication circuits generally do not exhibit such Rayleigh fading. They are, however, subject to very reduced channel S+N/N ratios, particularly in third world or lightly industrialized nations. As is well known in the art, the expression S+N/N denotes signal-to-noise ratio in terms of signal plus noise divided by noise. Telephone modem performance is generally such that, as the required bit rate is reduced, poorer channel S+N/N ratios may be tolerated to produce a given bit-error rate.

Thus, there exists a marked difference in requirements in the use of a counter-addressed encryption synchronization method for achieving the best possible over-the-air performance when contrasted with the need to allow telephone line communications with presently achievable circuits in lightly industrialized nations where poorer line S+N/N parameters are likely to exist.

Accordingly, a need arises for a method for integrating the over-the-air performance achievable with a counter-addressed encryption method with the lower required channel S+N/N ratio needed by the telephone line modems when the bit rate is effectively reduced.

SUMMARY OF THE INVENTION

This need and others are satisfied by the method of the present invention, in which an encrypted two-way RF communication unit is transparently coupled with an encrypted landline communication unit. The method comprises the steps of transmitting, from the RF communication unit, an RF message comprised of a plurality of data frames, wherein a plurality of the data frames include encrypted voice information, selectively removing some bits from the data frames, without removing the encrypted voice information, to form reduced bit data frames, and transmitting the reduced bit data frames via the landline to the landline communication unit.

DESCRIPTION OF A PREFERRED EMBODIMENT

Figure 1:
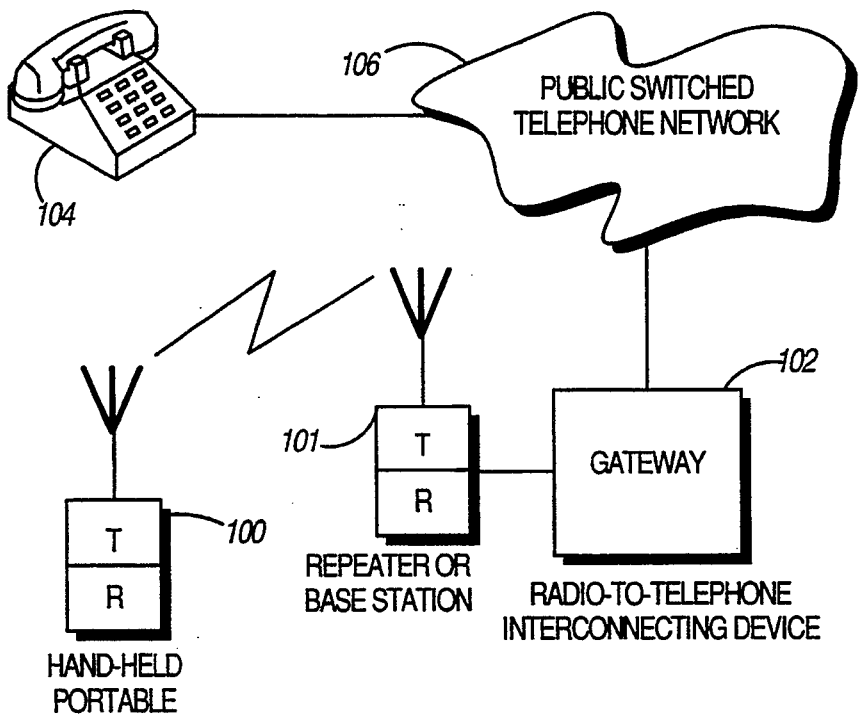
FIG. 1 illustrates the overall encrypted radiotelephone system.

FIG. 1 illustrates the overall context and environment of an encrypted communication system, showing an encrypted telephone (104) connected to an encrypted subscriber portable (100) via the Public Switched Telephone Network (106) and a gateway interconnect unit (102). The gateway (102) provides the interface between the PSTN and RF communication units, as is well-known in the art. A portable communication unit (100) is shown in the figure for purposes of illustration, but the RF communication unit could be a portable, a mobile unit, or even a base station.

Figure 2:
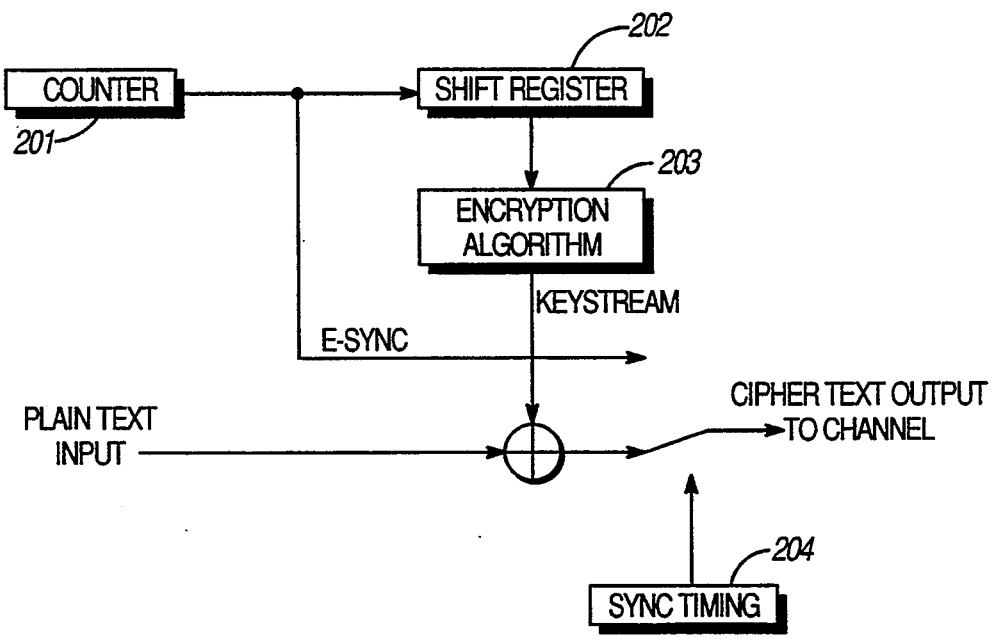
FIG. 2 illustrates the transmit method for a counter-addressed encryption system.

Such systems will often employ a counter-addressed encryption sync method, also known in the art. In such an encryption synchronization method, referring to FIG. 2, the contents of the counter (201) both provide an address for the encryption algorithm, and also, via a sync timing-controlled multiplexer (204) are sent to the output channel MUX'ed (multiplexed) with the encrypted cipher text output.

Figure 3:
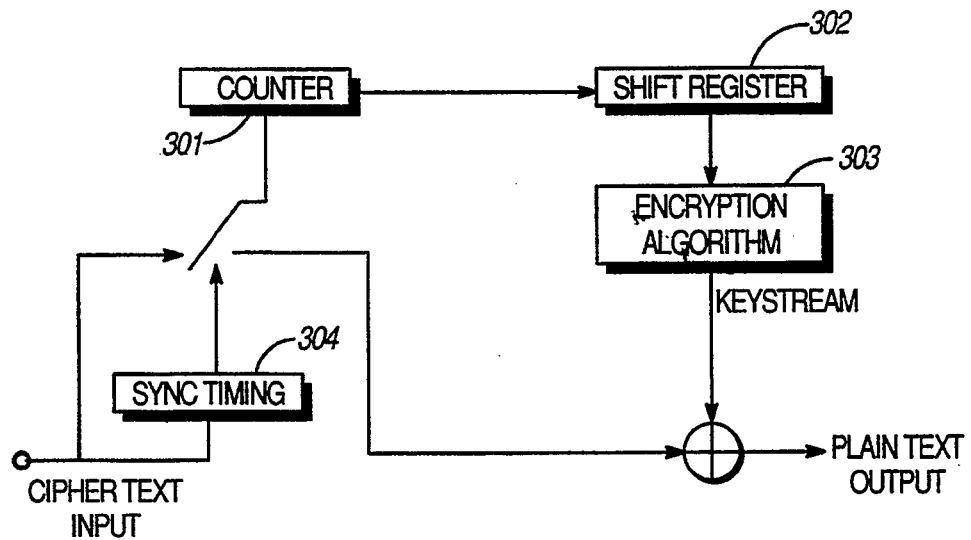
FIG. 3 illustrates the receive method for a counter-addressed encryption system.

This periodic burst of counter contents serves to provide receive synchronization when the cipher text output is transmitted over some channel and is then to be decrypted. FIG. 3 illustrates the decryption process, in which the counter (301), actually a linear feedback shift register, is periodically reloaded with new contents (after being error corrected) from the channel. At other times, the counter is run closed loop and provides addresses to the decryption algorithm (303) via a shift register (302). In this manner, a single channel error has a latency of only one bit, and will cause no further extension in bit error rate, as measured at the Plain Text Output of the decryption algorithm.

Figure 4:
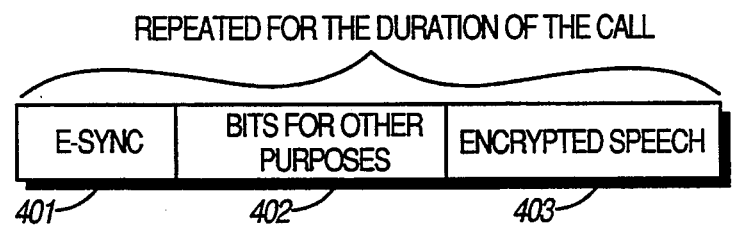
FIG. 4 illustrates the protocol used for the over-the-air bitstream.
Figure 5:
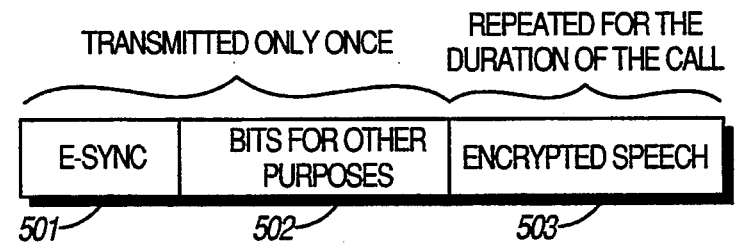
FIG. 5. represents the over-the-wire bit stream protocol used for poorer S+N/N ratio telephone lines.

The method of the present invention provides an over-the-air bit stream protocol as depicted in FIG. 4, while providing an over-the-wire bit stream protocol as depicted in FIG. 5. The over-the-air bitstream protocol is organized into at least three categories of frames. First, an encryption sync frame (401); next, bits for other purposes (402) (for example, indices to key variables, addresses of source or destination, personal ID's of subscriber radios, type of encryption, etc.); and finally, actual encrypted speech frames (403). Since the RF channel is subject to the effects of Rayleigh fading, and since mitigation of the possibility of a bit slip is required, the E-sync must be repetitively transmitted throughout the duration of a call or transmission.

Figure 6:
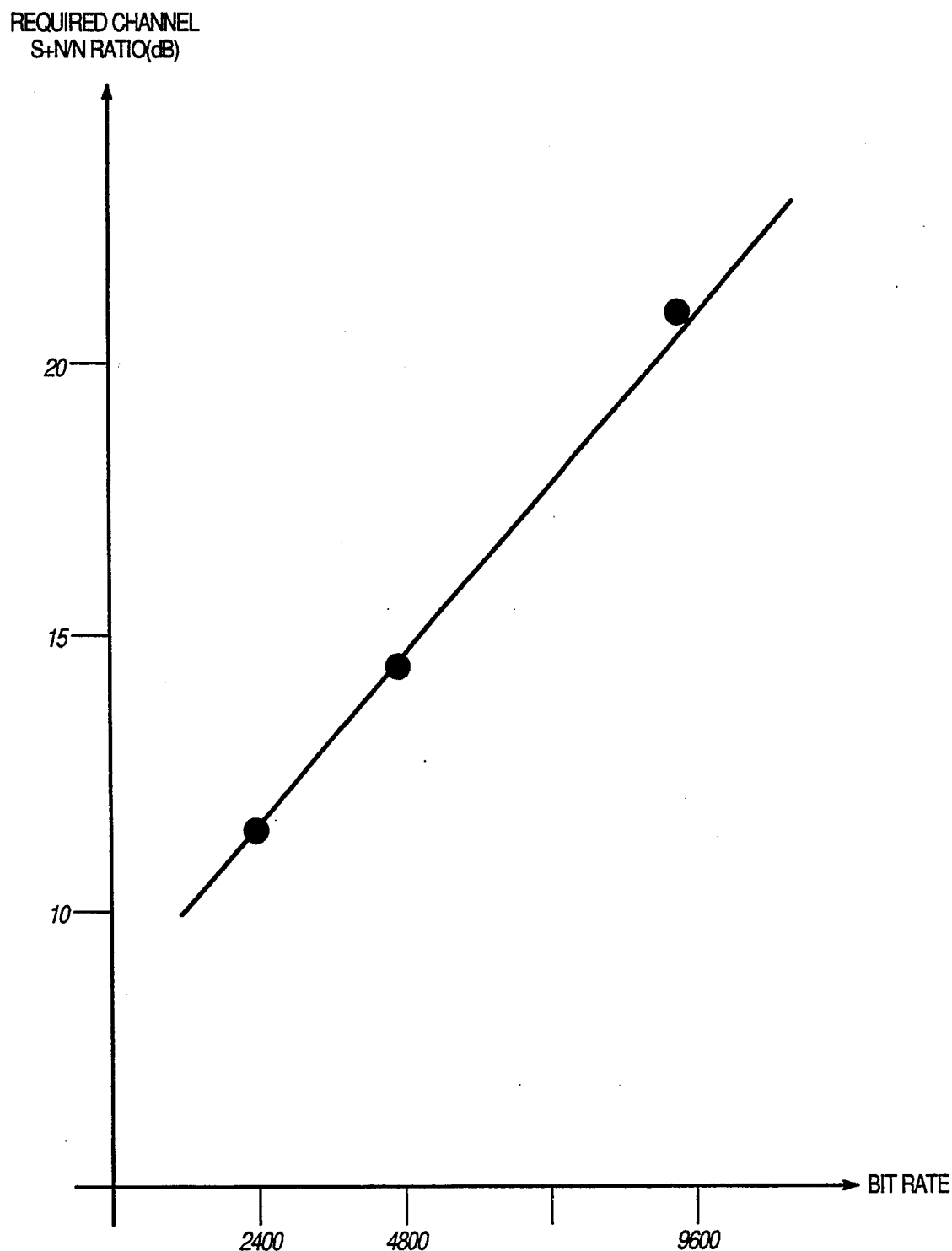
FIG. 6 is a graphical representation of the tradeoff of bit rate vs. the required S+N/N ratio.

As shown in FIG. 5, however, the over-the-wire bit stream protocol only transmits the E-sync (501) once during the initial call setup. Following the initial call setup interval, only encrypted speech packets (503) are transmitted. The objective here is to obtain the benefits of the lower overall bit rate on the telephone line, which is graphically depicted in FIG. 6. This figure is a representation of the required channel signal-to-noise ratio required by typical, commercially available modems. In a typical embodiment, the encrypted speech frames may be only half of the overall bit rate. Reducing the bit rate from 9600 bits/sec to 4800 bits/sec would therefore yield a reduction in the required S+N/N ratio of 6-7 dB.

Figure 7:
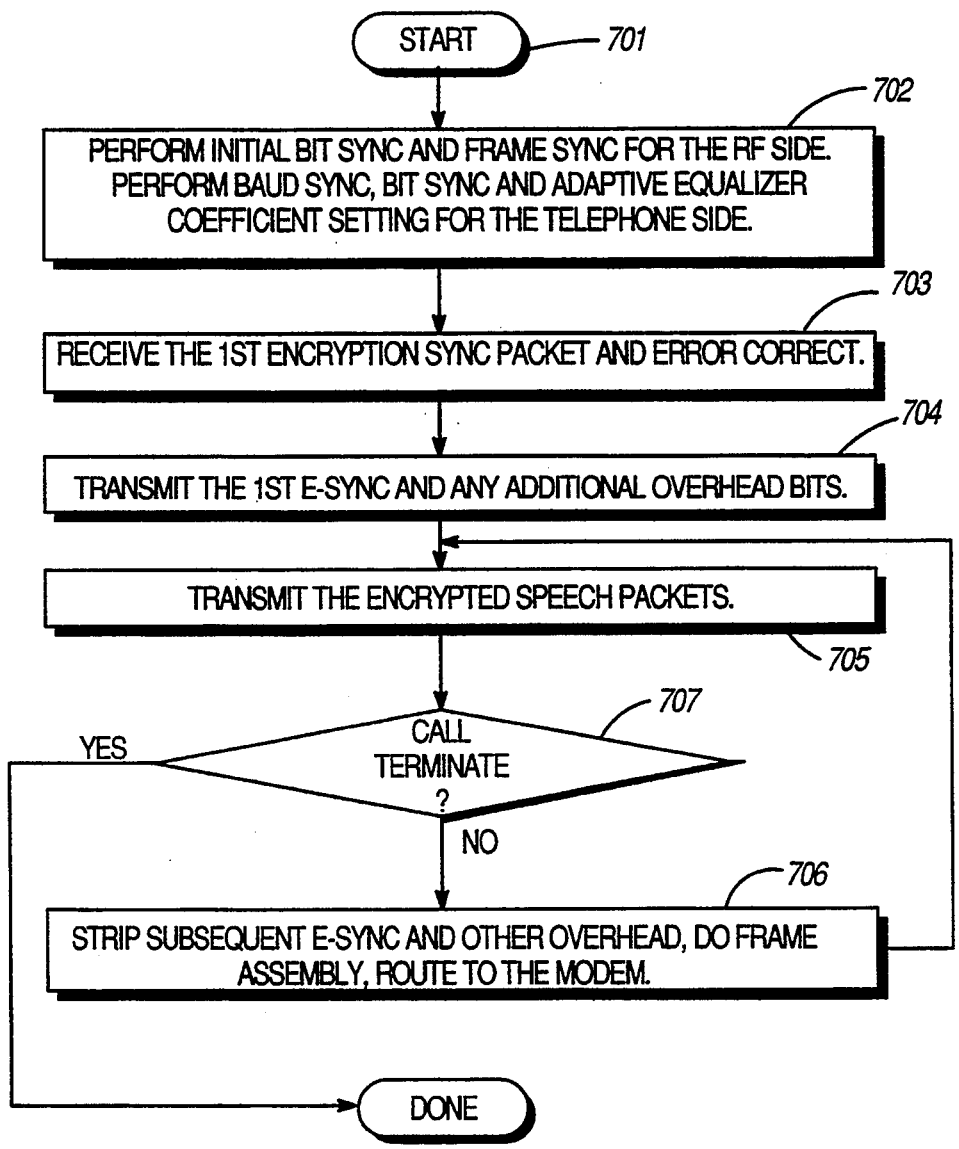
FIG. 7 is a flow chart representation showing the E-sync computation and insertion with the telephone subscriber talking and the RF subscriber listening.
Figure 8:
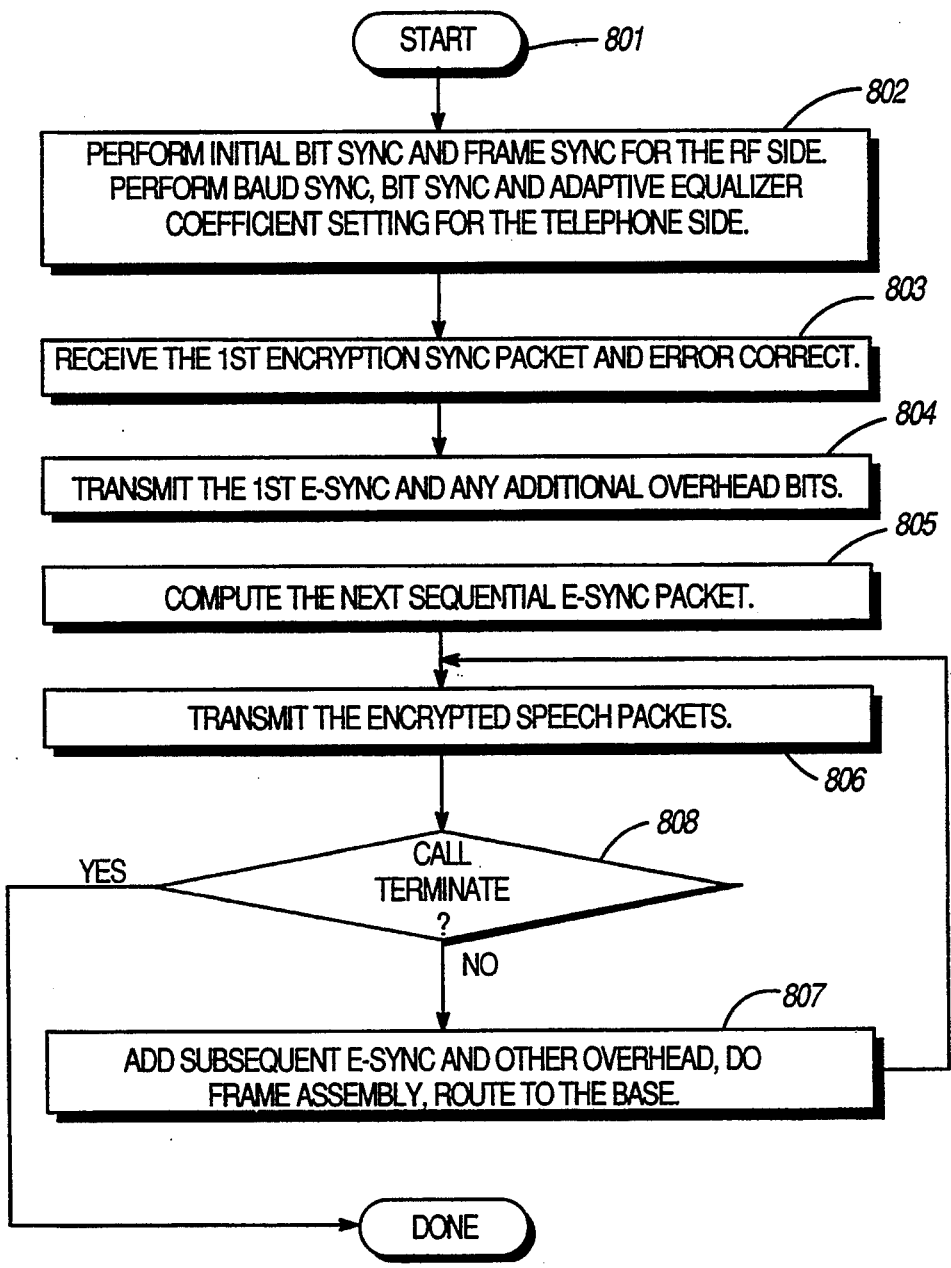
FIG. 8 is a flow chart representation of the initial use of E-sync and subsequent deletion with the telephone subscriber listening and the RF subscriber talking.

The actual operation of the gateway interconnect device is depicted by FIG. 7 and FIG. 8. These flow charts demonstrate the method for performing superframe teardown and assembly in both directions. FIG. 7 shows the generation of the required data flow when the telephone subscriber is listening and the RF subscriber is talking. FIG. 8 shows the generation of the required data flow when the telephone subscriber is talking and the RF subscriber is listening. Operation may be either full-duplex or half-duplex; that is, it is easily possible in the preferred embodiment to run the processes demonstrated by the flow charts concurrently. Of course, when operation reverts to half-duplex, a further reduction in the required channel S+N/N ratio over the telephone line is obtained.

As discussed previously, in FIG. 7, the telephone subscriber is listening, with the source of the message traffic being the RF communication unit. After the start (701), the following operations may be thought of as part of the call setup process, and are performed one time only. First, initial bit sync and frame sync are performed for the port listening to the RF side. With that synchronization achieved, the landline side performs a parallel function. The telephone modems achieve baud sync, bit sync, and coefficient setting for the Least Mean Square Error algorithm in associated adaptive equalizers, which are widely used in the art (702). Next, as shown in flowchart block 703, the first E-sync frame is received from the RF subscriber, error-corrected, and applied to the decryption algorithm. Then, the first E-sync frame, as well as any additional overhead frames, are transmitted to the telephone subscriber unit (704). The next frame, the first encrypted speech frame, is received from the RF subscriber unit and is also routed to the telephone line modem, as illustrated in block 705, for transmittal to the telephone subscriber unit. Subsequently, only encrypted speech frames received from the RF subscriber are routed to the modem. E-sync is discarded (706). Operation continues as described until a call knockdown is performed (707). Optionally, the frame designated for other purposes in the over-the-air protocol may contain a bit field designated to control operation in the manner just described, or a simpler pass-through mode, where the over-the-air bit stream is identical to the over-the-wire bit stream. Alternatively, the method of the reduced over-the-wire bit rate may be automatically selected by available indications of modem received bit-error rate or by available indications of error detect which may be embedded in the frames holding the encrypted speech.

In FIG. 8, the RF communication unit is listening, with the source of the message traffic being the telephone subscriber unit. After the start (801), initial call setup in blocks 802-804 proceeds in much the same way as it was characterized in the discussion of FIG. 7 related to blocks 702-704. Here, however, the encryption sync frame, which is received from the telephone subscriber unit, after being first transmitted to the RF subscriber, is applied to a counter of the type described in the discussion of counter-addressed encryption systems above. The next sequential E-sync frame is then computed from the first received E-sync frame (805), and used in assembling the super frame (807), which is then routed to the RF subscriber unit (806). The frame designated as "bits for other purposes" (402 in FIG. 4) would typically be merely a copy of the first such frame received from the telephone subscriber unit.

What is claimed is:

1. A method for transparently coupling an encrypted two-way radio frequency (RF) communication unit with an encrypted landline telephone communication unit, the method comprising the steps of:
  (a) transmitting, from the RF communication unit, an RF message comprised of a plurality of data frames wherein a plurality of the data frames include encrypted voice information and E-sync frames from said RF communication unit;
  (a-1) receiving, at a gateway between said RF communication unit and said landline telephone communication unit, said RF message comprised of a plurality of data frames;
  (b) discarding E-sync frames from said plurality of data frames to form reduced bit data frames; and (c) transmitting the reduced bit data frames via a public switched telephone network to the landline communication unit.

2. A method for transparently coupling an encrypted two-way RF communication unit with an encrypted telephone communication unit, the method comprising the steps of:
(a) transmitting, from the RF communication unit, an RF message comprised of a plurality of data frames, wherein a plurality of the data frames each include:
(i) an encryption sync signal;
(ii) a plurality of encrypted speech bits;
(iii) a plurality of other bits;
(b) receiving at a gateway coupling the RF communication unit to a public switched telephone network, the RF message;
(c) forming an initial data frame that includes the encryption sync signal;
(d) transmitting the initial data frame via the public switched telephone to the telephone communication unit;
(e) forming subsequent data frames that consist of the encrypted speech bits; and
(f) transmitting the subsequent data frames via the public switched telephone network to the telephone communication unit.

3. The method in accordance with claim 2, wherein the RF message is transmitted at a first baud rate.

4. The method in accordance with claim 3, wherein the subsequent frames are transmitted at a second baud rate, which second baud rate is less than the first baud rate.

* * * * *

UNITED STATES PATENT AND TRADEMARK OFFICE
CERTIFICATE OF CORRECTION

PATENT NO. : 5,361,302
DATED : November 1, 1994
INVENTOR(S) : Charles J. Malek et al.

It is certified that error appears in the above-identified patent and that said Letters Patent is hereby corrected as shown below:

In Claim 2, Col. 6, line 4, please insert after "telephone" the word --network--.

Signed and Sealed this

Seventh Day of March, 1995

Attest:

BRUCE LEHMAN

Attesting Officer     Commissioner of Patents and Trademarks